(12) United States Patent
Vella et al.

(10) Patent No.: US 11,472,075 B2
(45) Date of Patent: Oct. 18, 2022

(54) METHOD FOR THE PRODUCTION OF COMPONENTS WITH A BENDING POINT AND SUCH A COMPONENT

(71) Applicant: Volkswagen Aktiengesellschaft, Wolfsburg (DE)

(72) Inventors: Salvatore Vella, Wolfsburg (DE); Oliver Mende, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 384 days.

(21) Appl. No.: 16/799,403

(22) Filed: Feb. 24, 2020

(65) Prior Publication Data
US 2020/0269478 A1 Aug. 27, 2020

(30) Foreign Application Priority Data
Feb. 22, 2019 (DE) ...................... 10 2019 104 607.6

(51) Int. Cl.
B29C 45/00 (2006.01)
B60R 13/08 (2006.01)
B29L 31/30 (2006.01)

(52) U.S. Cl.
CPC ...... B29C 45/0081 (2013.01); B60R 13/0861 (2013.01); *B29L 2031/3005* (2013.01)

(58) Field of Classification Search
CPC ............. B29C 45/0081; B60R 13/0861; B29L 2031/3005
See application file for complete search history.

(56) References Cited

U.S. PATENT DOCUMENTS

| 6,155,624 | A | * | 12/2000 | Bienenstein, Jr. | ... B62D 25/161 280/847 |
| 2015/0175093 | A1 | * | 6/2015 | Vaughn, Jr. | ......... B60R 13/0861 296/39.1 |
| 2018/0009398 | A1 | * | 1/2018 | Onishi | ................... B32B 27/36 |

(Continued)

FOREIGN PATENT DOCUMENTS

| CN | 203727483 U | 7/2014 |
| CN | 203920927 U | 11/2014 |
| DE | 102006054172 A1 * | 5/2008 ......... B60R 13/0861 |

(Continued)

OTHER PUBLICATIONS

BASF; "Dimensionierung von Filmscharnieren—Technische Informationen", May 2014; relevant sections cited in European Office Action dated Jul. 16, 2020: 1.14; 1.15; 1.16, 1.17.

(Continued)

*Primary Examiner* — Lori L Lyjak
(74) *Attorney, Agent, or Firm* — Muncy, Geissler, Olds & Lowe, P.C.

(57) ABSTRACT

To provide a method for the production of components, in particular wheel well liners of vehicles, in which the component is produced in a spread out or unfolded form and at a later time is moved into a curved or folded form, wherein in an area of a bending point, a material strength of the component decreases as compared to a material strength of the adjacent area, it is suggested that the minimum thickness of the material in the area of the bending point is molded to be 40% to 60%, preferably 45% to 55%, more preferably about 50% less than the material strength of the adjacent area.

16 Claims, 3 Drawing Sheets

(56) References Cited

U.S. PATENT DOCUMENTS

2018/0326923 A1* 11/2018 Königbauer ........ B60R 13/0861
2021/0188685 A1    6/2021 Gahagan et al.

FOREIGN PATENT DOCUMENTS

| DE | 102006054172 A1   |   | 5/2008  |                |
|----|-------------------|---|---------|----------------|
| DE | 10 2006 054 172 B4|   | 9/2008  |                |
| DE | 102009057939 A1   |   | 6/2011  |                |
| DE | 102014101332 A1   | * | 8/2014  | ........... B62D 25/161 |
| EP | 1571099 A2        |   | 9/2005  |                |
| EP | 1293331 B1        |   | 4/2006  |                |
| GB | 2510163 A         | * | 7/2014  | ......... B60R 13/0861 |
| JP | 2017160575 A      | * | 9/2017  | ............... B32B 5/26 |
| WO | WO-2004098808 A1  | * | 11/2004 | ............. B21D 39/03 |
| WO | WO2018213267 A1   |   | 11/2018 |                |

OTHER PUBLICATIONS

European Search Report dated Jul. 16, 2020 in corresponding application 20158604.7—partial translation identifies relevant portion of cited document "Dimensionierung von Filmscharnieren—Technische Informationen".
Chinese Search Report dated Mar. 17, 2022 in corresponding application 202010112383.7.
"Design of Plastic Parts"; Jun. 30, 2001, pp. 199-200, 206-207.
"Structural Design and Manufacture of Packaging Containers", Aug. 31, 1996, p. 146.

* cited by examiner

METHOD FOR THE PRODUCTION OF COMPONENTS WITH A BENDING POINT AND SUCH A COMPONENT

This nonprovisional application claims priority under 35 U.S.C. § 119(a) to German Patent Application No. 10 2019 104 607.6, which was filed in Germany on Feb. 22, 2019, and which is herein incorporated by reference.

BACKGROUND OF THE INVENTION

Field of the Invention

The present invention relates to a method for the production of components, in particular wheel well liners of motor vehicles, in which the component is produced in a spread out or unfolded form and is folded into a curved or folded form at a later time, wherein in an area of a bending point, the material strength of the component decreases as compared to the material strength of an adjacent area. The invention further relates to a component produced using a method.

Description of the Background Art

Methods are already known in production technology, for example, components are made of plastic by injection molding or transfer molding. However, if the components have strong curvatures or an omega shape, several parts are often necessary because the injected plastic cannot sufficiently fill molds that have pronounced curvatures. The handling of several parts leads to a more complex assembly and requires more space in the processing line in the assembly hall as well as several part numbers for the administration thereof. The production of multi-part systems therefore leads to a considerable logistics effort, which is associated with costs. In addition, expensive slides often have to be attached to the connections of the various components in order to assemble them into a curved component.

Methods for producing one-piece components with curvatures are also known. However, the one-piece, curved components are often not stackable or cannot be stacked efficiently, since a great deal of space remains unused between the outside of one component and the inside of the next component and transportation is more expensive due to reduced packing density and/or more or larger transport boxes.

Alternatively, the issue of the packing density of components with curvatures can be resolved by installing a classic film hinge in the component, since the component can be opened at the film hinge and thus better stacking for transport is possible. The film hinge also allows for the component to be produced in one piece in a mold. Here, however, especially in injection molding processes, the problem is frequently that a bottleneck is created at the film hinge and the plastic can no longer be optimally pressed into the cavity behind it. Such a bottleneck should therefore be avoided in injection molding processes by using a better component design. In addition, the classic film hinge does not have optimal buckling behavior because the material is very thin at the kink. This often causes material weakening, cracks or stress whitening of the kink, which can also lead to the breaking of the material and to the separation of the individual parts of the curved component.

DE 10 2006 054 172 B4 describes a method for the production of curved, self-supporting components, in which plate-like single or multilayer semi-finished products are molded, in particular in molding tools, and moved into the form of the curved final component, and the pre-molded individual elements are not moved into the final curved component form until they are at the installation site, wherein in this case the semi-finished products are pre-molded into associated individual elements. The components of the patent specification consist of several layers, wherein the core layer is greatly thinned or excluded at the connecting area of the associated individual elements.

SUMMARY OF THE INVENTION

It is therefore an object of the present invention to produce a component, in particular a curved or partially curved component, in such a way that the component can be folded or curved into its final form in an area of the bending point without, however, causing the material to weaken at the bending point or even causing cracks or stress whitening. In addition, bottlenecks on the curved component should be avoided so that this can also be produced, for example, in the conventional injection molding process without restrictions.

To achieve this object, the present invention provides a method for the production of components, in particular curved or partially curved components, particularly wheel well liners of motor vehicles, in which the component is produced in a spread out or unfolded form and at a later time is folded or curved into a curved or folded form. The component is molded such that in an area of a bending point, the material strength of the curved component decreases as compared to the material strength of an adjacent area. The material strength in the area of the bending point is made to be thinner than the material strength of the adjacent area by 40% to 60%, preferably by 45% to 55%, in particular by approximately 50%.

A curved or arched component is a component which has a curvature or arch in one or more directions, wherein, for the case of several curves or arches, these are preferably bent towards each other, thus have the same sign. Here, the curvatures or arches may have different radii of curvature or arching radii.

The spread out or unfolded form is the form in which the component is produced, i.e., the tool position in the form of the mold cavity. In the spread out or unfolded form, the component is stretched, wherein the direction of curvature in the area of the bend preferably is inverted, that is, the center of the circle of the radius of curvature lies on the other side of the component than in the curved state. The component can be of any shape and, except for the area of the bending point, can be molded, for example, from curved or arched sections or from at least two linear sections.

Here, the area of the bending point refers to that point of the component at which the curvature, when folded together, is changed into the form of the curved state, wherein the material strength in the area of the bending point decreases and increases again. The area of the bending point is the entire area of the decrease and increase in the material strength in the longitudinal direction of the bending point, starting from the material strength of the adjacent area on the one side, up to the point at which the material strength of the adjacent area has been reached again on the other side.

The curved or folded form represents the form of the component after folding or curving at the bending point. This is preferably the final form of the component or the form of the component, which was originally constructed, and the form in which the component is further processed or assembled, i.e., the assembly position. In the inventive method, therefore, the final form of the component is not produced in the mold as this is obtained only at a later time by folding or curving the component.

In this context, folding or folding up or curving at a later time means that the change in the form of the component does not take place in a spread out, unfolded or stretched form during or just after production of the component, but that one or more method steps may take place in between, for example, storage, packing or transportation of the component, in a spread out, unfolded or stretched form. As a result, the place of production is usually not the location where the component is folded or curved.

The areas adjoining the area of the bending point are also called adjacent areas. In this case, these are the areas of the component which are directly connected to the bending point, which, however, lie outside the range of decreasing and increasing material strength. The material strength of the adjacent areas is greater everywhere than in the area of the bending point. In areas that are further away, however, the material strength can again decrease and/or increase.

The material strength refers to the thickness or the height of the material (in section) at the respective point. According to the invention, the minimum material strength in the area of the bending point is molded to be less than 40% to 60%, preferably 45% to 55%, particularly preferably approximately 50% of the material strength of the adjacent area. Here, the minimum material strength in the area of the bending point, i.e., the area of the bending point at which the thinnest material strength is achieved, is compared with the maximum thickness of the material in the adjacent areas. Beyond the areas of the adjacent areas, the material strength can assume a different value, for example in other areas of the component, that is to say it can decrease or increase again. Preferably, the maximum material strength again somewhat decreases beyond the adjacent areas, since the adjacent areas are produced with an increased material strength.

The decrease in the material strength from the adjacent areas to the minimum material strength in the area of the bending point takes place continuously, that is to say without abrupt changes in material strength or steps in the material strength. Here, the curvature of the top and bottom of the component in the area of the bending point is formed with a similar radius of curvature, that is, the top and bottom of the component run virtually parallel also in the area of the bend. This prevents a discontinuity in the material strength and hence a steady or slow transition of material strength in the area of the bending point up to the minimum material strength.

This slow material strength transition from a thicker material strength in the adjacent areas to a material strength in the range of 40% to 60%, preferably 45% to 55%, more preferably about 50% of the material strength in the adjacent areas has several advantages. A wider area of the bending point allows for the stress during bending or folding to be better distributed, and thus when the component is folded or bent, there is a more harmonious stress distribution and therefore less risk of breakage or cracks. This also prevents the stress whitening that is frequently observed with plastics. In addition, in the present method, during injection of the plastic into the mold, there are no bottlenecks in the molding tool as compared to traditional injection molding processes with very thin film hinges. This allows for the plastic to flow or stream into the mold more uniformly and there is less danger of blockage, for example at the bottleneck. This also improves the flow behavior of the plastic in the injection molding process. Since a stable hinge is co-produced in the same process, there is no need to use expensive slides, which reduces assembly times and lowers the cost of the overall component.

Preferably, with the present method, the width of the area of the bending point is formed twice to thirty times, preferably, five times to twenty times, more preferably ten times to twelve times, thicker than the material strength of the adjacent area. In this case, the area of the bending point can rise above the adjacent surface, or be on one level with it, that is, form a flat bending point. The thickness of the material strength or the strength of the material is the distance of the component from its top to its bottom, and thus the height of the molding tool in which the component is produced. The great width of the area of the bending point improves the distribution of stress when folding or curving the component and thus leads to a significantly more stable component. It is therefore an important factor in reducing cracks and whitening.

With the present method, an area of uniform material strength is preferably formed in the area of the bending point. The area of uniform material strength is an area in which the material strength does not change, but instead remains uniform at the level of the minimum material strength. This area with uniform material strength is preferably twice as long to half as long as the material strength of the area of the bending point. The area of uniform material strength is particularly preferably the same width as the thickness of the material strength of the area of the bending point.

In the production of the curved component, the area of uniform thickness can be formed with the minimum material strength. The minimum material strength is the lowest material strength in the area of the bending point, that is to say the area in which the material strength has decreased by 40% to 60%, preferably by 45% to 55%, particularly preferably by approximately 50% of the material strength of the adjacent area. Particularly preferred, the area with a minimum material strength is formed in the middle of the area of the bending point. Preferably, the area of the bending point is formed symmetrically, more preferably axially symmetrically, wherein the area of minimum material strength lies on the axis of symmetry, thus, the symmetry axis runs through the center of the area of minimum material strength.

The component can remain open in at least one direction when folding or curving into the curved or folded form. The component is therefore not closed in all directions, but preferably open in at least two directions. This means that even in a curved or folded form, the component preferably does not form a closed form, but is open.

The component can remain open in the direction opposite the bending point when it is bent or folded into the curved or folded form. However, the component preferably has further openings which are not opposite the bending point. This does not rule out that the component also contains an opening on the bending point side.

An opening width, which is shorter than a greatest inner width of the component parallel to the opening, is created when folding or curving the component into the curved or folded form. The opening width is understood to be the distance of the component sides located opposite each other located in the plane of the opening. For example, at the end of the component, i.e. where the opening begins, the distance is measured from one edge to the opposite edge. The greatest inner width is determined parallel to the opening width of the component, not in the plane of the opening, but rather at the height of the maximum extension, preferably the maximum internal extension of the component. In circular or elliptical components, this greatest inner width would, for example, correspond to the diameter or double the semimajor axis. It is crucial that the opening width and the greatest inner width are parallel to each other in the component, in order to be comparable.

When folding or curving the component into the curved or folded form, the component can be folded or curved in such a way that an undercut, preferably of at least 7°, is created on a side of the component, particularly preferably in each case an undercut is created, preferably of at least 7°, on now opposite sides of the component. An undercut is an area of the component that, starting from the edge of the greatest inner width, i.e. the line of the plane of the greatest inner width, is inclined with a curvature back to the opposite side, i.e. reduces the width of the planes parallel to the plane of the greatest inner width with a greater distance toward the latter. That is, the component bends beyond the plane of the greatest inner width, preferably with the pre-existing curvature or arch, wherein the distance between the opposite sides in the area of the undercut decreases. The undercut, which leads from the plane of the greatest inner width proceeding to the opening in this case is preferably curved or straight and inclined to the opposite side of the component, such that the opening width is shorter than the greatest inner width. The component is again tapered accordingly from the plane of the inner width, proceeding in the direction of opening and preferably has, when viewing the entire curved or folded form, an omega shape.

If one now considers a section through the component produced with a preferred method step, which includes both the extent of the greatest inner width and is perpendicular to the plane of the inner width and the plane of the opening, then one can determine the angle of the undercut. If one draws a straight line in the cutting plane on one side of the component through the end point of the component, i.e. the edge at the opening of the component or its intersection with the cutting plane, and continues the line to the end point of the greatest inner width, i.e. the point on the inside wall of the component which is part of the greatest inner width and is closest to the previously determined end of the opening, one obtains a leg of the angle. The angle itself is formed by the straight line just described and the tangent to the end point of the inner width on the inner wall of the component. The apex of the angle is therefore at the end point of the inner width, i.e. the point on the inner wall of the component from which the greatest inner width can be measured. This angle just described is preferably at least 7°, but preferably greater.

The spread out or unfolded form of the component can be produced by injection molding. In the injection molding process, the mold is filled with a suitable thermoplastic or a suitable thermoplastic granulate. The component is accordingly preferably molded from plastic, particularly preferably from thermoplastic. The injection molding process provides a major advantage in the injection of the thermoplastic in particular due to the thicker minimum material strength of the component produced according to the preferred method, since the thermoplastic is significantly less clumped and there is no bottleneck in the mold as there is in a classic film hinge.

The component can be molded from only one material and/or with a single layer. In contrast to multilayer molds or the use of several materials, this makes it much easier to handle the component and simplifies production. In this case, the material itself does not have to be homogeneous. It is however, not made up of a plurality of layers, and/or no film is applied to the top or bottom of the material. Likewise, a reinforcement layer or filler layer is not provided in the middle of the component.

After production in the spread out or unfolded form, the part can be packed and transported, and the bending, curving or folding of the component into the curved or folded form is only performed subsequently or afterwards. There can be several steps between production and bending, curving or folding of the component, for example, transport, packing, storage or stacking of the component. In this case, the component in the spread out or unfolded form can be very efficiently packaged, and still has a high stability and a low probability of being damaged in the area of the bending point due to the large thickness of the material in the area of the bending point.

Likewise, a component designed in according to the method, in particular a curved, arched or partially curved component, in particular a wheel well liner of motor vehicles, is the subject of the invention. Here, the component has a bending point and in one area of the bending point has a material strength of the component which is less than that of an adjacent area. According to the invention, the minimum material strength in the area of the bending point is 40% to 60%, preferably 45% to 55%, in particular approximately 50% less than the material strength of the adjacent area.

The area of the bending point can have a width which is twice to thirty times, preferably five to twenty times, particularly preferably ten to twelve times as long as the material strength of the adjacent area is thick.

The component can have an area of uniform material strength, which is preferably arranged centrally in the area of the bending point. The material strength in the area of uniform material strength is particularly preferably the minimum material strength.

The component in the curved or folded form can have an opening in at least one direction, preferably in the side opposite the bending point. Preferably, the component in the curved or folded form also has an undercut, for example, of at least 7°.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
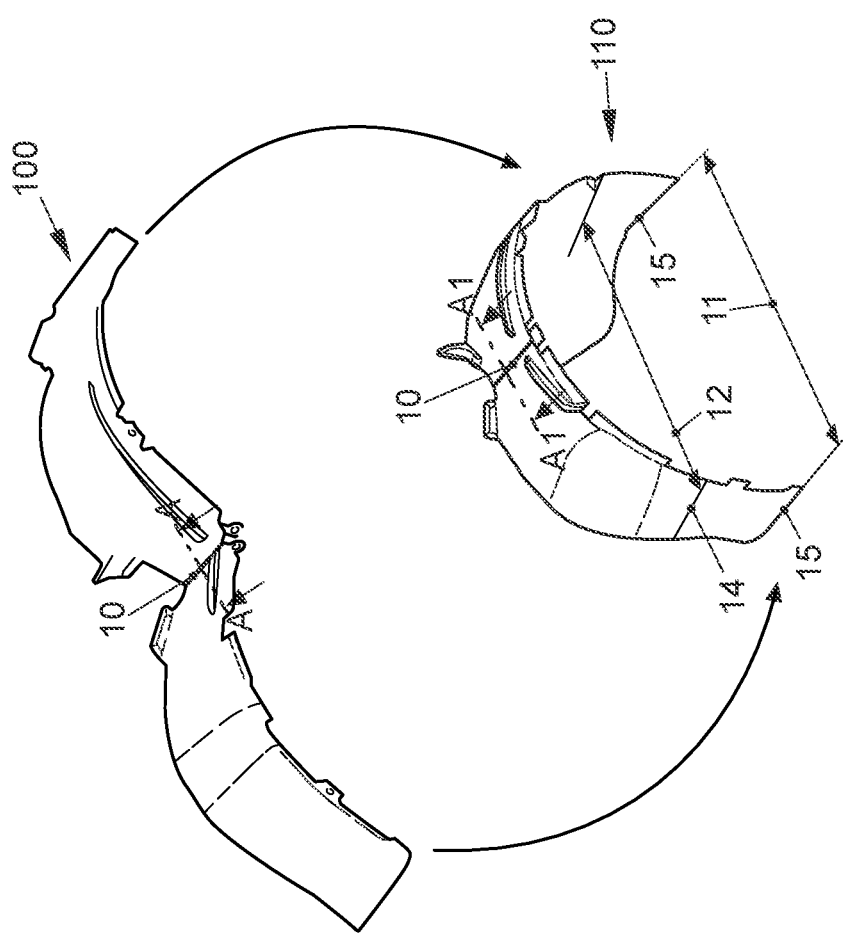
FIG. 1 shows a component in a spread out or unfolded and curved or folded form.

FIG. 1 schematically shows a component in a spread out or unfolded form 100 and a component in a curved or folded form 110. The bending point 10 of the component lies at half the length, in the middle of the component. In a curved or folded form 110, the opening width 11 leads from one edge of the opening 15 to the opposite edge of the opening 15. The greatest inner width 12 of the component in a curved or folded form 110 connects the two inner edges of the greatest inner width 14 at the point of the greatest diameter of the component in the curved or folded form 110. The arrows on the diagram show the folding or curving of the component from its spread out or unfolded form 100 into the curved or folded form 110. In the curved or folded form, the opening of the opening width 11 is on the opposite side of the bending point 10.

Figure 2:
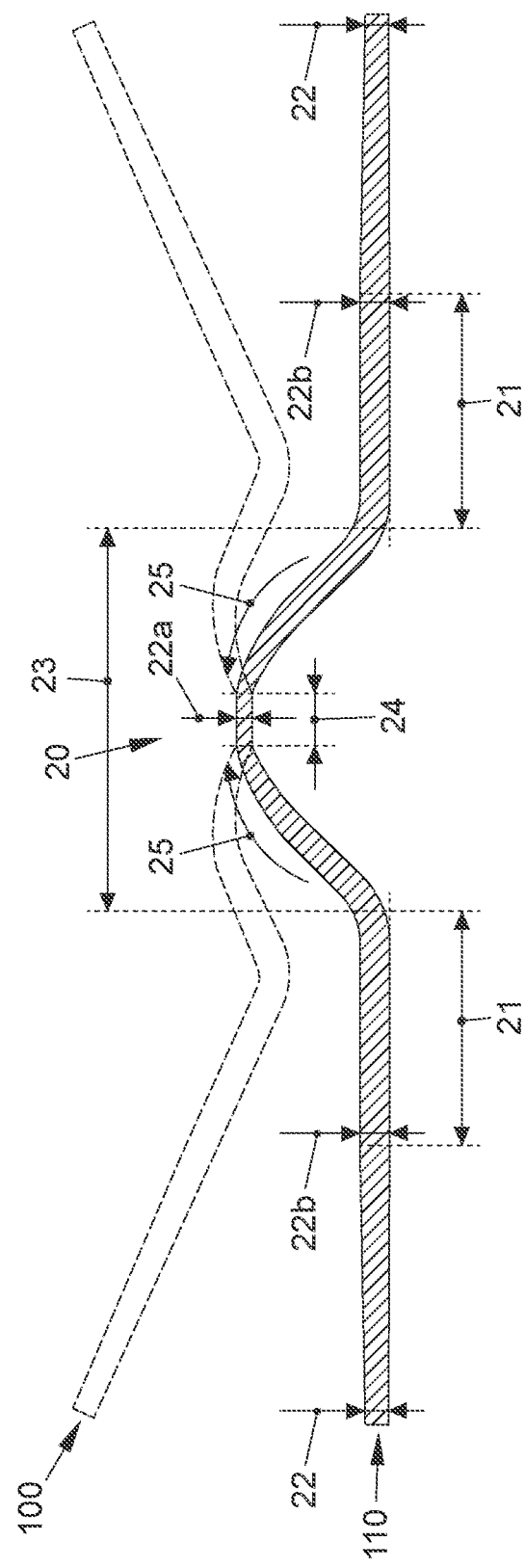
FIG. 2 shows a sectional view through the component along section line A-A or A1-A1.

FIG. 2 shows a section along the section line A-A of the component in a spread out or unfolded form 100 or the section line A1-A1 of the component in a curved or folded form 110 from FIG. 1. In the middle of the axially symmetrical cut is the area 23 of a bending point 20 with the adjacent area 21 to the right and left of area 23. The component has a material strength 22 which changes over the course of the cut. The minimum material strength 22*a* is located in the middle of the area of a bending point 20 in the longitudinal direction of the bending point, wherein in at the point of the minimum material strength 22*a*, there is an area of uniform material strength 24 in which the material strength 22 does not change. The material strength of the adjacent area 22*b* is thicker than the minimum material strength 22*a* in the center of the area of a bending point. The material strength transition from the material strength of the adjacent area 22*b* to the minimum material strength 22*a* is continuous. The area of a bending point has a similar radius of curvature 25 on the top and bottom of the component in the curved or folded form 110. The top and bottom of the area of a bending point 20 are accordingly curved to a similar extent, wherein the radius of curvature 25 is uniform over the area of a bending point. The area of uniform material strength 24 is located in the center of the area of a bending point 20 at the point of the minimum material strength 22*a*. In this case, the area of uniform material strength 24 is half as wide as the minimum material strength 22*a* is thick. The double radius of curvature 25 is 10 times as large as the material strength of the adjacent area 22*b*. The minimum material strength 22*a* is half the material thickness of the adjacent area 22*b*. Beyond the adjacent area 21, the material strength 22 can then again decrease or increase, depending on what is required for the curved component.

Figure 3:
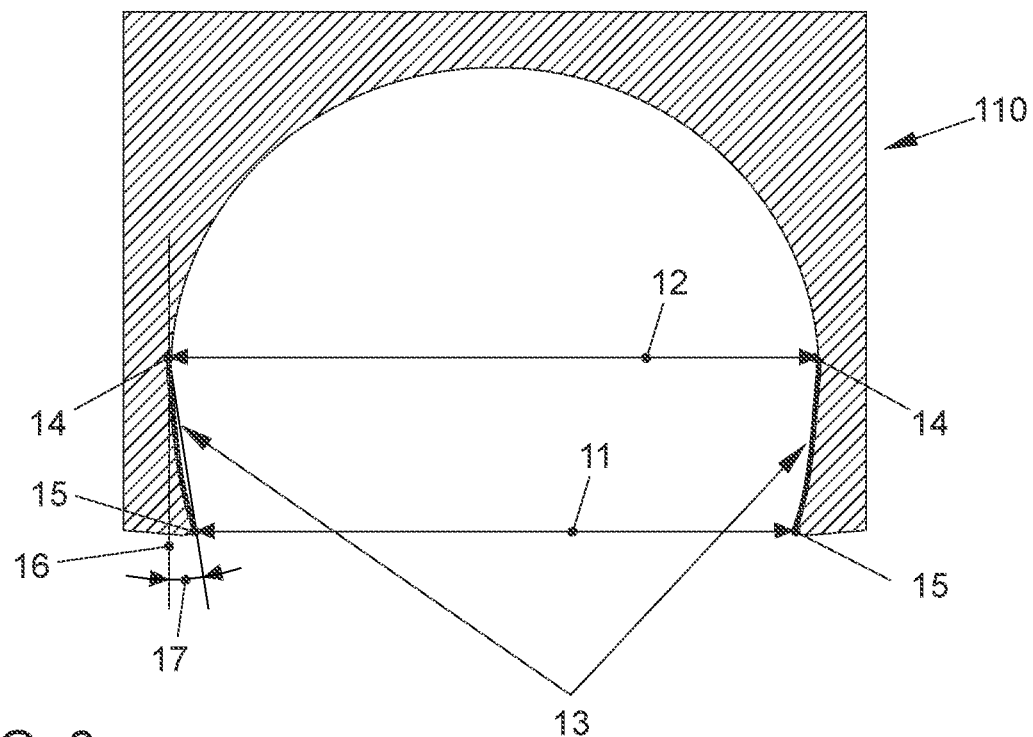
FIG. 3 shows a sectional view through the component in a curved or folded form.

FIG. 3 shows a section through the component in a curved or folded form. The length of the greatest inner width 12 leads from an inner edge of the greatest inner width 14 to the opposite side of the inner edge of the greatest inner width 14. The opening width 11 connects the two edges of the opening 15 on opposite sides. Between the inner edge of the greatest inner width 14 and the edge of the opening 15, the distance between the two sides of the component is reduced, as a result of which the opening width 11 is shorter than the greatest inner width 12. A so-called undercut is thus created in this area. Through the inner edge of the greatest inner width 14 and the edge of the opening 15 on the respective side, the straight line 13 forms an angle of at least 7° with the tangent 16 to the inner edge of the greatest inner width. This angle is the angle of the undercut 17.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for the production of components, in particular curved or partially curved components, especially of wheel well liners of motor vehicles, in which the component is produced in a spread out or unfolded form and is moved to a curved or folded form at a later time,
    providing the component with a bending point, a material strength of the component in an area of the bending point is designed to be decreasing or smaller than a material strength of an adjacent area; and
    providing a minimum material strength in the area of the bending point to be 40% to 60%, 45% to 55% or about 50% smaller than the material strength of the adjacent area.

2. The method according to claim 1, wherein a width of the area of the bending point is designed to be twice to thirty times, five times to twenty times, or ten times to twelve times the thickness of the material strength of the adjacent area.

3. The method according to claim 1, wherein an area of uniform material strength is molded in the area of the bending point.

4. The method according to claim 3, wherein the area of uniform material strength is molded with minimum material strength.

5. The method according to claim 1, wherein the component remains open in at least one direction when the component is curved or folded into the curved or folded form.

6. The method according to claim 5, wherein the component remains open in the direction opposite the bending point when the component is curved or folded into the curved or folded form.

7. The method according to claim 5, wherein, when the component is curved or folded into the curved or folded form, an opening width is created that is shorter than a greatest inner width of the component parallel to the opening.

8. The method according to claim 7, wherein when the component is curved or folded into the curved or folded form, the component has an undercut of at least 7°.

9. The method according to claim 1, wherein a spread out or unfolded form of the component is produced by injection molding.

10. The method according to claim 1, wherein the component is molded from only one material and/or with a single layer.

11. The method according to claim 1, wherein, after production, the component is packed and transported in the spread out or unfolded form or position and that the curving or folding of the component into the curved or folded form is carried out just before installation.

12. A component, in particular a curved or partially curved component, especially a wheel well liner of motor vehicles, the component comprising:
    a bending point; and
    a material strength of the component in an area of the bending point being less than that of an adjacent area,
    wherein a minimum material strength in the area of the bending point has a material strength that is 40% to 60%, 45% to 55%, or approximately 50% less than the material strength of the adjacent area.

13. The component according to claim 12, wherein the width of the area of the bending point is twice to thirty times, five times to twenty times, or ten times to twelve times, the thickness of the material strength of the adjacent area.

14. The component according to claim 12, wherein the component has an area of uniform material strength, which preferably has a minimum material strength.

15. The component according to claim 12, wherein the component, in a curved or folded form, has an opening in at least one direction or in a direction opposite the bending point.

16. The component according to claim 12, wherein the component, in the curved or folded form, has an undercut of at least 7°.

* * * * *